March 26, 1963 C. B. LIVERS 3,082,953
TEMPERATURE CONTROL MIXING VALVE
Filed Nov. 20, 1961 2 Sheets-Sheet 1
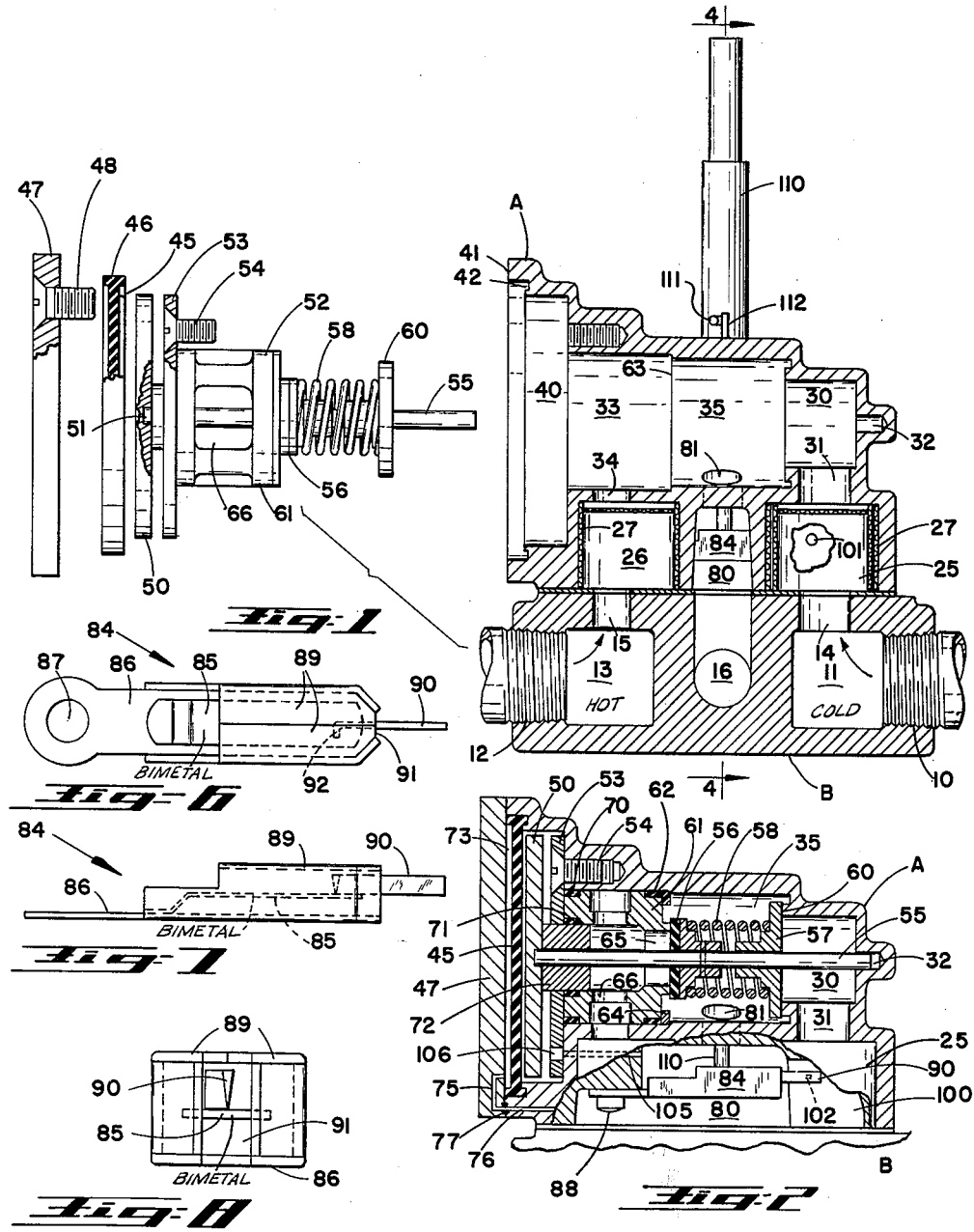
INVENTOR.
CARLOS B. LIVERS
BY
*Geo. R. Schermerhorn*
ATTORNEY

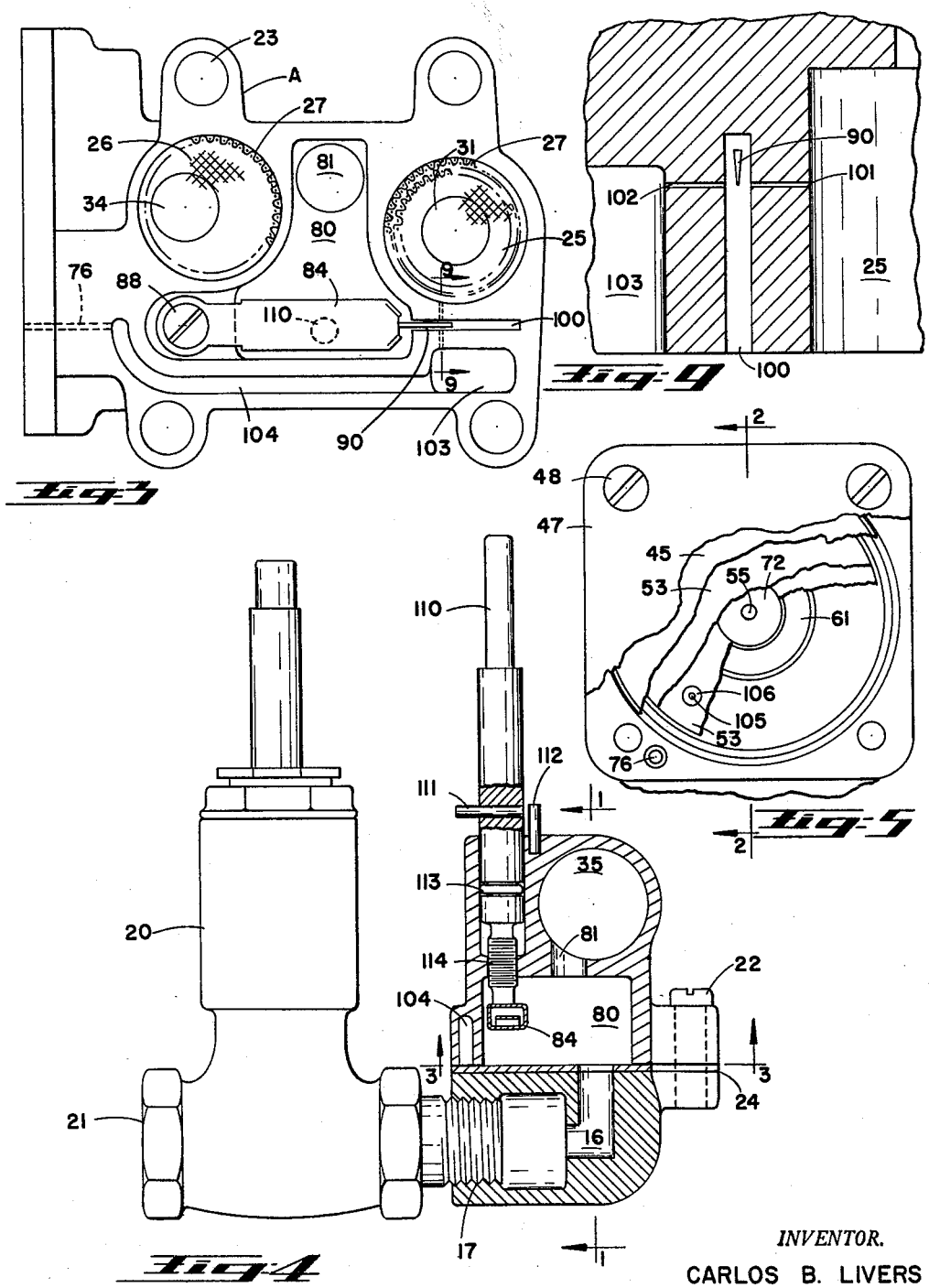

United States Patent Office 3,082,953
Patented Mar. 26, 1963

3,082,953
TEMPERATURE CONTROL MIXING VALVE
Carlos B. Livers, North Hollywood, Calif., assignor to
Miles Lowell Edwards, Santa Ana, Calif.
Filed Nov. 20, 1961, Ser. No. 153,496
4 Claims. (Cl. 236—12)

This invention relates to a mixing valve for hot and cold water to control the temperature of the mixed stream which issues from the valve.

This valve is an improvement on the mixing valve shown in the Edwards Patent No. 2,819,843, dated January 14, 1958. In the Edwards patent a control mechanism is contained within an interior housing which is mounted within a pressure resistant outer housing. The control mechanism includes a valve assembly and a pressure responsive diaphragm unit arranged to actuate one of the valves in the valve assembly. The diaphragm unit is controlled by a jet of water directed into a receiving orifice which communicates with a chamber behind the diaphragm. A vane on a thermostatic element is arranged to move into and out of the path of the jet for controlling the hydraulic pressure acting on the diaphragm in response to the temperature of the water mixture whereby the mixture will issue from the valve at a predetermined temperature.

The present device operates in the same general manner but is constructed differently to improve the sensitivity of the temperature control and to provide a more economical form of construction or manufacture. Other objects are to eliminate the interior housing for the temperature control mechanism, to provide an improved arrangement of the diaphragm and valve assembly, to provide a novel and improvel valve port arrangement, to simplify the construction and assembly of the operating parts, and to provide an improved thermostatic element and jet intercepting vane.

In the present construction, a relatively simple and inexpensive casting forms a housing or valve body member which is provided with a succession of coaxial cylindrical bores of diminishing size to receive the valve assembly and diaphragm unit. A cover plate on the end of the largest bore provides access to these parts which are progressively smaller in diameter to fit within the different bores in the housing. The valve and diaphragm parts are all insertable axially through a single opening in one end of the housing before the cover plate is applied. This facilitates assembly permitting the principal parts of the mechanism to be fabricated as a sub-assembly which may then be inserted bodily as a unit into the housing opening. Also in the present construction, greater sensitivity is obtained by an improved shape of intercepting vane.

The invention will be better understood and additional objects and advantages will become apparent from the following description of the preferred embodiment illustrated in the accompanying drawings. Various changes may be made, however, in the details of construction and arrangement of parts and all such modifications within the scope of the appended claims are included in the invention.

In the drawings:

FIGURE 1 is an exploded sectional view of a temperature control valve embodying the features of the present invention, taken on the line 1—1 in FIGURE 4;

FIGURE 2 is a similar view of the main housing showing the parts in assembled relation and showing certain parts broken away from the plane of the line 1—1 in FIGURE 4;

FIGURE 3 is a bottom plan view of the main body housing taken on the line 3—3 of FIGURE 4;

FIGURE 4 is a cross sectional view taken approximately on the line 4—4 of FIGURE 1;

FIGURE 5 is an end view of the main body housing with parts broken away;

FIGURE 6 is a plan view of the thermostatic unit;

FIGURE 7 is a side elevation view of the thermostatic unit;

FIGURE 8 is an end view of the thermostatic unit; and

FIGURE 9 is an enlarged fragmentary sectional view taken on the line 9—9 of FIGURE 3.

Referring first to FIGURE 1, the valve comprises two main castings, one being a body housing A and the other a base member B. The base member has a threaded opening 10 to receive a cold water pipe in communication with a cold water inlet passage 11, and a threaded opening 12 to receive a hot water pipe in communication with a hot water inlet passage 13. From these inlet passages the cold water flows out of the base member through an opening 14 and the hot water flows out through an opening 15.

Between the two inlet passages 11 and 13 is a central outlet passage 16 terminating in a threaded opening 17 for connection with a flow control valve 20 as shown in FIGURE 4. The valve 20 is used to control the volume of flow of the temperature controlled water and is used as a shut-off valve to shut off the flow entirely. Valve 20 has an outlet connection 21 through which the temperature controlled water passes to the spigot, shower head or appliance where it is to be used. The present device is of particular utility as a bath shower valve where close control of the water temperature is especially desirable.

The housing and base parts A and B have flat faces which are secured together by screws 22 in the four holes 23 in FIGURE 3. A gasket 24 provides a water-tight joint between the two housing parts, this gasket having openings for the passages 14, 15 and 16 and screws 22. Main body housing A has a cavity forming a filter chamber 25 in the cold water passage in communication with passage 14 and a cavity forming a filter chamber 26 in the hot water passage in communication with passage 15. In order to leave these chambers the water must pass through screens 27.

One end of housing A has a small cylindrical bore 30 communicating through passage 31 with filter chamber 25. A boss on the small end of the housing contains a small bore 32 coaxial with the bore 30. Adjacent to the other end of housing A is a large bore 33 communicating with filter chamber 26 through a passage 34. Between the bores 30 and 33 is a bore 35 of intermediate size. Outward from the large bore 33 the large end of the housing contains a large circular recess or bore 40 which is partially within a square end flange 41. A larger diameter shallow recess 42 surrounds the margin of bore 40 within the end flange. The bores 40, 33, 35 and 30 are coaxial and together form a single bore or opening in the large end of the body casting. Thus, the casting is generally cup-shaped with a stepped taper.

A flexible rubber diaphragm 45 has a flanged peripheral edge 46 which fits in the recess 42 when square cover plate 47 is applied against the outside edge of flange 46. Screws 48 in the corners of cover plate 47 secure this member to the flange 41 so that the diaphragm flange 46 is compressed to form a seal against body member A on one side and cover plate 47 on its opposite side.

A rigid metal pressure or backing plate 50 bears against the inside of the diaphragm 45. This pressure plate is provided with a central bearing recess 51. Inside of cover plate 50 a valve assembly 52 is retained in the smaller bores of housing A by a retainer ring 53 secured by screws 54 as shown in FIGURE 2.

The various parts of valve assembly 52 are mounted on a central rod 55. The outer end of rod 55 is received in recess 51 in the diaphragm backing plate 50, while the inner end of rod 55 is supported for reciprocation in the bore or bearing socket 32 in the small end of housing A. The only part of the valve assembly connected with rod 55 is the hot water inlet valve 56, the other parts being slidable on the valve rod. One of these slidable parts is the cold water valve disc 57 which is urged away from valve disc 56 by a compression spring 58. Valve disc 57 bears against the rim seat of cold water inlet port 60, this port and seat being an integral extension of the cylindrical wall of bore 30 into bore 35.

Hot water valve disc 56 against the rim seat of an annular port member 61. The inner cylindrical end of port member 61 is equipped with a sealing ring 62 to make a seal within the large bore 33. The shoulder 63 between bores 33 and 35 provides an abutment for spacer ring 64 which acts as a stop to position the inner end of port member 61. Port member 61 is of skeletal construction having an axial port 65 cooperating with the valve disc 56 and a plurality of radial openings 66 to receive water from the bore 33 and its inlet opening 34. The outer end of port ring 61 has an outer seal ring 70 engaging the wall of bore 33 and an inner seal ring 71 engaging a cylindrical bearing block 72. This bearing block centers the outer end of rod 55 and cooperates with the outer end of port member 61 to close the outer end of bore 33. Hot water valve port 65 is smaller than the cold water valve port 60 so that the hot water pressure will not open valve 56 against the force of spring 58.

Thus, all the movable valve parts, as well as the stationary port member 61, are insertable into the large end of housing A and are retained in operative position by the ring 53. Spring 58 urges both valve discs toward closed positions with the hot water valve 56 being operable by valve rod 55 in response to inward movement of the diaphragm 45 while the cold water valve 57 is opened by reduction in pressure in the bore 35 when the outlet or volume control valve 20 is opened. Bore 30 forms a cold water inlet chamber, bore 33 forms a hot water inlet chamber and bore 35 forms a valve chamber. Bore 40 contains the diaphragm 45 and a diaphragm chamber 73.

A small U-shaped passage 75 in cover plate 47 communicates a control pressure from a passage 76 in the body A to the outside face of the diaphragm in diaphragm chamber 73, the inner opening of passage 75 being close to the diaphragm flange 46 so that the opening cannot become sealed by the diaphragm bearing against cover plate 47. A seal ring 77 prevents leakage in the joint between passages 75 and 76 at the inner surface of the cover plate. Cover plate 47 does not require a sealing ring around its periphery, as this function is performed by the flange 46 on the diaphragm.

A large cavity in the body member A between the screen chambers 25 and 26 forms a mixing and temperature sensing chamber 80 (FIGURE 3). This chamber receives the hot and cold flows from valve chamber 35 through an opening 81 and discharges the mixed flows into outlet passage 16. The opening and passage 81 and 16 are preferably at one side of the chamber 80. On the opposite side of this chamber is a thermostatic control unit, indicated generally by the numeral 84 in FIGURES 3 and 4.

The construction of the thermostat unit 84 is best shown in FIGURES 6, 7 and 8. One end of the bimetallic strip 85 is soldered to a flexible supporting tongue 86 having a hole 87 in one end thereof. A screw 88 in the hole 87 mounts the thermostatic unit in the chamber 80 as shown in FIGURE 3.

Support member 86 preferably comprises a flat strip of sheet metal having side wing portions 89 bent up and folded over across the top of the bimetallic element to form an open-ended housing around the top, bottom and sides of the thermostatic strip. A vane or blade 90 projects through the open and end 91 of this housing. Vane 90 has an L-shaped inner end 92 which is soldered on the top side of the free end of the bimetallic element. The base and housing parts 86, 89 are spaced away from all sides of the bimetallic element and vane 90 so that these parts have freedom for vertical movement in response to temperature change as viewed in FIGURES 7 and 8.

The thermostatic unit 84 mounted in the chamber 80 so that the vane 90 projects into a narrow slot 100 in the body member A, as best shown in FIGURES 3 and 9. A minute nozzle orifice 101 opens into the slot from the cold water filter chamber 25. When water is being used as a result of opening outlet valve 20 there is a pressure drop across opposite ends of the nozzle passage 101 to cause a jet of water to project into the slot 100. This pressure drop results from the action of spring 58 which tends to hold the cold water valve 60 in closed position. When outlet valve 20 is opened, the pressure is reduced in valve chamber 35, allowing the cold water pressure to open valve 60 against the force of spring 58 to admit cold water into the valve chamber 35, from whence it passes through opening 81 to mixing chamber 80 which is in communication with slot 100.

This jet of water from nozzle orifice 101 is directed into a receiving orifice 102 which is aligned with the orifice 101. Both of these orifice are preferably very small in diameter, as for example .025 inch. The inner end of receiving orifice 102 is located in a control pressure chamber 103 which is connected with a passage 104 leading to the passage 76, which in turn communicates with the passage 75 in FIGURE 2 communicating with the diaphragm chamber 73. The open bottom sides of chamber 103 and passage 104 are closed and sealed by the gasket 24.

Thus, when outlet valve 20 is closed, the pressure acting on the outside of diaphragm 45 is the same as mixing chamber pressure which is the same as the cold water pressure in filter chamber 25. When outlet valve 20 is opened causing a jet of water to issue from nozzle orifice 101, this jet impinges on receiving orifice 102 to raise the pressure in diaphragm chamber 73 and bow the diaphragm inward or to the right in FIGURE 2. The pressure of the diaphragm against diaphragm plate 50 operates through valve rod 55 to open the hot water valve 56. The pressure in mixing and sensing chamber 80 is communicated to the inner side of the diaphragm through a small passage 105 in FIGURE 2. Retaining ring 53 is apertured at 106 in register with the outer end of this passage.

Vane 90 assumes a normal cold position just above the common axis of the nozzle and receiving orifices 101 and 102 as shown in FIGURE 9. In this position it does not intercept the jet from nozzle 101, and the full force of this jet is applied to the receiving orifice 102 to raise the pressure in chamber 103 and diaphragm chamber 73 to a value above the pressure existing in valve chamber 35 and mixing and sensing chamber 80, as just described. When the opening of valve 56 introduces hot water into the mixing and sensing chamber 80, the bimetallic strip 85 bends downward causing the lower edge of vane 90 to intercept the jet from nozzle 101.

For reasons which will presently be explained, the vane 90 is made wedge shaped with its lower intercepting edge taking the form of a knife edge. As an example of suitable dimensions for the vane 90, its lower edge should be between zero and .005 inch in thickness. In order to provide stiffness against bending of the vane under the impact of the jet, the upper edge is made 0.02 inch thick and the width of the vane in a vertical direction is 0.062 inch. These dimensions as well as the orifice diameters are merely illustrative, however, and are not intended to limit the invention.

Vane 90 and bimetallic strip 85 are mounted so that the vane has free movement without touching the sides of slot 100, and both the vane and the bimetallic element have free movement within the mounting and casing structure 86, 89. The wedge angle of the vane is not sufficient to produce an upward reaction on the vane from the force of the jet, the force of the jet being negligible against the impact area of the jet but being vastly greater when exerted over the large area of diaphragm 45.

The water temperature is adjusted by a handle on the vertical stem 110 in FIGURE 4. Stem 10 is mounted for rotation in a bore in housing A. A pin 111 in the stem is arranged to engage a stop pin 112 in the housing to limit rotation to approximately 360°. Inside the bore which receives the stem in housing A there is a sealing ring 113 around the stem to prevent leakage. Below this sealing ring the stem is threaded at 114 so that it will move up and down a short distance when it is turned.

The lower end of the stem protrudes into mixing and sensing chamber 80 and bears against the top wall of thermostat housing 89. The base portion 86 of this housing constitutes a spring element which holds the housing firmly against the end of stem 110 so that the vane 90 may be raised and lowered by turning the stem. The knob for stem 110 is equipped with a pointer which turns in front of an escutcheon plate containing hot and cold markings to assist in adjusting the thermostat to the desired water temperature. The flow through opening 81 being spaced to one side of the thermostatic unit does not affect its position as adjusted by stem 110.

From the foregoing description it will be appreciated that the parts may be economically manufactured and assembled. The hot and cold water valves 56 and 60 are assembled on valve rod 55 together with spring 58 and port member 61. These parts are then inserted into housing A as a unit, projecting the end of the valve rod into bearing socket 32 and securing the unit by retainer ring 53. Then the diaphragm plate 50, diaphragm 45 and cover plate 47 are assembled and secured by screws 48. Thermostatic unit 84 is mounted in chamber 80 before base member B is secured to the body member. There are no small or sensitive parts to install and adjust in spaces of limited access and a high degree of precision and skill is not required in assembly.

Operation

When outlet valve 20 is closed, the cold and hot water valves 60 and 56 remain closed as shown in FIGURE 2, and there is no flow through nozzle orifice 101. If the water contained in mixing and sensing chamber 80 is colder than the temperature for which the thermostat is adjusted, the vane 90 will repose above the axis of nozzle 101 as shown in FIGURE 9.

When outlet valve 20 is opened, the pressure drop in valve chamber 35 and mixing and sensing chamber 80 causes the cold water pressure to open cold water valve 60 and at the same time issue a jet from nozzle orifice 101 into receiving orifice 102. The transmission of this increased pressure from chamber 103 to diaphragm chamber 73 deflects the diaphragm 45 and moves valve rod 55 to the right in FIGURE 2, opening the hot water valve 56, causing a mixture of hot and cold water to issue from outlet valve 20. The opening of hot water valve 56 further compresses spring 58 and applies increased spring force against cold water valve 60 which tends to increase the pressure differential across the nozzle orifice 101 and restrict the flow of cold water.

As the water temperature increases in the mixing and sensing chamber 80, vane 90 moves downward until it brushes the edge of the jet directed into receiving orifice 102. This reduces the pressure in diaphragm chamber 73, allowing hot water valve 56 to move slightly toward closed position. A point of equilibrium is reached when the blending of the hot and cold water flows through the valves 60 and 56 produces the desired temperature of mixture for which the thermostat is adjusted. This equilibrium condition is not necessarily a static condition of the thermostat but may be obtained through the vibration or oscillation of vane 90 up and down through an infinitesimal excursion as it brushes the edge of the jet. However, the results of such hunting movements are not observed at the water outlet because if such movement does occur it is too rapid to produce noticeable variation in the temperature of the water which is discharged from the mixing chamber. Therefore, for purpose of explanation, it may be assumed that the vane 90 reposes in an equilibrium position which intercepts a sufficient portion of the jet from nozzle 101 to establish that pressure in chamber 103 and diaphragm chamber 73 which will hold the hot and cold water valves 60 and 56 in the relative positions necessary to produce the desired temperature of water in the mixing chamber.

The provision of a knife edge on the jet intercepting edge of vane 90 improves the operation. When the interrupting edge has appreciable thickness the operation tends to become erratic and non-repetitive, depending upon whether the vane is entering or leaving the jet stream. Interruption and restoration of the jet do not take place at exactly the same point in the movement of the vane. This effect can be demonstrated by shutting off the hot water supply and using the temperature control handle as a means of controlling the cold water valve position. If the thermostat unit is set in a position which would normally call for some hot water under these conditions, the cold water will automatically be shut off by the opening of hot water valve 56 to such an extent as to hold cold water valve 60 closed. Likewise, if the thermostatic control is set for a position where no hot water is required, the cold water valve will open freely. By moving the temperature control back and forth it is possible to open and close the cold water valve. It is then observed that the position of the control stem 110 which produces closing of the cold water valve 60 is not the same as the position for opening this valve. It is found that the space between these two positions is much less when the intercepting edge of the vane is sharp. As a result of this cutoff improvement the normal operation of the valve is also improved.

The explanation is believed to be as follows. When there is an appreciable surface width on the intercepting edge of the vane, there is a relatively broad flat surface which lies generally parallel to the jet stream. Apparently when this type of vane first enters the jet the flow lines tend to lie against this surface, and it is only after a deeper penetration that a definite break in their direction takes place. Once this break occurs it tends to persist as the blade is withdrawn. The original parallel flow is not reestablished until the blade has been withdrawn to a point which is farther out than the original break point. Since the knife edge leaves no flat surface, this clinging effect does not take place and the control is rendered more sensitive.

Having now described my invention and in what manner the same may be used, what I claim as new and desire to protect by Letters Patent is:

1. In a water temperature control valve having a diaphragm actuated valve member and a thermostatic vane movable between a nozzle orifice and a receiving orifice to control a fluid pressure acting on said diaphragm, a flat spring metal tongue having mounting means on one end thereof, side wings on said tongue bent to form an open end hollow box housing on one side of said tongue, a bimetallic thermostatic strip contained in said housing parallel with said tongue and having an offset end mounted on said tongue, said vane being mounted on the free end of said bimetallic strip and projecting longitudinally from one open end of said housing perpendicular to the plane of said strip, said vane having a sharp longitudinal edge arranged to intercept a jet from said nozzle orifice, and an adjusting screw perpendicular to said tongue having an inner end bearing against said box housing.

2. In a water temperature control valve, a generally cup-shaped one-piece housing having a stepped taper, the small end of said housing being closed by an integral end wall and the large end opening into a series of coaxial cylindrical bores in said housing of successively smaller diameter, the smallest of said bores forming a cold water inlet chamber having a cold water inlet passage through one side of said housing, said smallest bore having a rim forming a port and valve seat projecting into the inner end of the next larger bore, said next larger bore forming a valve chamber having an outlet passage through said one side of said housing, the next larger bore beyond said valve chamber forming a hot water inlet chamber having a hot water inlet passage through said one side of said housing, the largest of said bores forming a diaphragm and pressure plate chamber, a transverse diaphragm in said last bore, a cover plate on said housing closing the outer end of said largest bore and spaced from the outer side of said diaphragm to form a diaphragm chamber, a pressure plate on the inner side of said diaphragm, bearing sockets in the center of said diaphragm plate and housing end wall, a longitudinal valve rod supported at its ends in said sockets for sliding movement in said end wall socket, a port member in said hot water inlet chamber having a cylindrical rim forming a valve seat in the outer end of said valve chamber, a hot water valve disc connected with said rod for movement away from said last valve seat by inward deflection of said diaphragm, a cold water valve disc slidably mounted on said rod to seat on said first valve seat, a single compression spring operative on said valves, said spring being interposed between said valve discs to urge both valves to closed position, a temperature sensing chamber in said one side of said housing communicating with said outlet passage, and a thermostat in said sensing chamber for controlling fluid pressure in said diaphragm chamber.

3. In a valve as defined in claim 2, a flat face on said one side of said housing having cavities defining hot and cold water filter chambers communicating with said hot and cold water inlet passages, respectively, and a cavity defining said sensing chamber, a base member having a flat face secured to said flat face of said housing, hot and cold water inlet connections in said base member communicating with said respective filter chambers, and an outlet connection in said base member communicating with said sensing chamber.

4. In a valve as defined in claim 3, a cavity in said flat face of said housing forming a control pressure chamber spaced from said cold water filter chamber, an elongated cavity and passageway means connecting said control pressure chamber with said diaphragm chamber, a slot in said flat face between said cold water filter chamber and said control pressure chamber and opening into said sensing chamber, a receiving orifice in one wall of said slot communicating with said control pressure chamber, a nozzle orifice in the opposite wall of said slot communicating with said cold water filter chamber and directed toward said receiving orifice, and a vane on said thermostat extending into said slot for movement into and out of intercepting position relative to said orifices, said base member closing one side of said cavities forming said sensing chamber, control pressure chamber and connecting passageway and said slot.

References Cited in the file of this patent
UNITED STATES PATENTS

| | | |
|---|---|---|
| 1,953,406 | Hodgson et al. | Apr. 3, 1934 |
| 2,107,188 | Ryder | Feb. 1, 1938 |
| 2,193,581 | Clokey | Mar. 12, 1940 |
| 2,205,334 | Barnes | June 18, 1940 |
| 2,324,100 | Maynard | July 13, 1943 |
| 2,550,907 | Brown | May 1, 1951 |
| 2,819,843 | Edwards | Jan. 14, 1958 |
| 2,889,113 | Kozel et al. | June 2, 1959 |
| 3,028,878 | Natho | Apr. 10, 1962 |